(12) United States Patent
Loeffler

(10) Patent No.: US 6,712,734 B1
(45) Date of Patent: Mar. 30, 2004

(54) GEARBOX FOR A MOTOR VEHICLE, ESPECIALLY A GEARBOX WITH A DUAL CLUTCH AND METHOD FOR OPERATING SAID GEARBOX

(75) Inventor: Juergen Loeffler, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,953

(22) PCT Filed: Oct. 16, 1999

(86) PCT No.: PCT/DE99/03323

§ 371 (c)(1),
(2), (4) Date: May 2, 2001

(87) PCT Pub. No.: WO00/26559

PCT Pub. Date: May 11, 2000

(30) Foreign Application Priority Data

Nov. 3, 1998 (DE) .......................... 198 50 549

(51) Int. Cl.⁷ ............................................. B60K 41/02
(52) U.S. Cl. ............................................. 477/5
(58) Field of Search ............................ 475/5; 477/5, 6; 74/664, 340; 180/65.2, 65.3, 65.6, 65.7

(56) References Cited

U.S. PATENT DOCUMENTS

| | | | | |
|---|---|---|---|---|
| 4,335,429 A | * | 6/1982 | Kawakatsu | 180/65.2 X |
| 4,533,011 A | * | 8/1985 | Heidemeyer et al. | 180/65.2 |
| 5,181,431 A | * | 1/1993 | Zaiser et al. | 74/664 X |
| 5,337,848 A | * | 8/1994 | Bader | 477/5 X |
| 5,433,282 A | * | 7/1995 | Moroto et al. | 180/65.2 |
| 5,730,675 A | * | 3/1998 | Yamaguchi | 477/4 X |
| 5,730,676 A | * | 3/1998 | Schmidt | 477/5 X |
| 6,019,698 A | * | 2/2000 | Lawrie et al. | 477/3 X |
| 6,044,719 A | * | 4/2000 | Reed, Jr. et al. | 74/330 |
| 6,159,127 A | * | 12/2000 | Loeffler et al. | 477/5 |
| 6,341,541 B1 | * | 1/2002 | Sakamoto et al. | 74/665 A |
| 6,409,623 B1 | * | 6/2002 | Hoshiya et al. | 475/5 |

FOREIGN PATENT DOCUMENTS

| | | | |
|---|---|---|---|
| EP | 0 724 977 A | 8/1996 | |
| EP | 0 845 618 A | 6/1998 | |
| FR | 1 445 735 A | 10/1966 | |
| FR | 22 00 800 | 4/1974 | |
| JP | 406144020 A | * 5/1994 | 180/65.2 |

* cited by examiner

Primary Examiner—Roger Pang
(74) Attorney, Agent, or Firm—Michael J. Striker

(57) ABSTRACT

A multi-speed transmission has two input shafts and one output shaft, each connected to a clutch and disconnectable by the clutch from the internal combustion engine of the motor vehicle, and one or two electric machines are associated with the two input shafts and connected to them by nonpositive engagement; the electric machines being located on the side of the clutches remote from the engine, so that it is possible to dispense with a starter and a generator for the engine.

10 Claims, 2 Drawing Sheets

GEARBOX FOR A MOTOR VEHICLE, ESPECIALLY A GEARBOX WITH A DUAL CLUTCH AND METHOD FOR OPERATING SAID GEARBOX

BACKGROUND OF THE INVENTION

The invention relates to a transmission for a motor vehicle, in particular a twin-clutch manual transmission.

In such known transmissions, for changing gears the rotary speeds of the members to be shifted are made to match one another by means of a synchronizing device, which as a rule has synchronizing rings. Furthermore, for starting the internal combustion engine of the motor vehicle, a separate starter is provided, which when the clutches are disengaged rotates the crankshaft of the engine. The engine is supplied with energy by the battery of the motor vehicle, which in turn is charged constantly by a generator. The known transmission and hence the motor vehicle thus require a number of coordinate devices for its operation, and the synchronizing devices are more or less complex in design.

SUMMARY OF THE INVENTION

The transmission of the invention for a motor vehicle, in particular a twin-clutch manual transmission has the advantage over the prior art that because of the electric machine coupled to the at least one input shaft, a starter and a generator for the engine can be dispensed with. Furthermore, easy synchronization of the members to be shifted of the various gears is possible without additional synchronizing devices.

A relatively small size of the electric machines is necessary if each of the two input shafts is equipped with a separate electric machine. Furthermore, in that case a relatively simple coupling to the input shafts can be attained. By comparison, if a distributor transmission is used, it is possible to employ merely a single electric machine, which can be coupled to one or the other of the input shafts.

Operating a motor vehicle with a transmission of the invention has the particular advantage that in the overrunning mode of the motor vehicle, the rolling energy of the vehicle can be converted into electrical energy that charges the on-board battery, if the electric machine or electric machines function as generators in the overrunning mode. It is also possible, for driving the motor vehicle in reverse, to dispense with a corresponding gear wheel set in the transmission, if an electric machine drives a forward gear in reverse.

It is also possible to use the electric machine or electric machines as an additional drive mechanism which reinforces the engine, so that greater total power can be furnished briefly, for instance during passing.

BRIEF DESCRIPTION OF THE DRAWINGS

Two exemplary embodiments of the invention are shown in the drawing and will be described in further detail below. Shown are.

DESCRIPTION OF THE PREFERRED EMBODIMENTS

Figure 1:
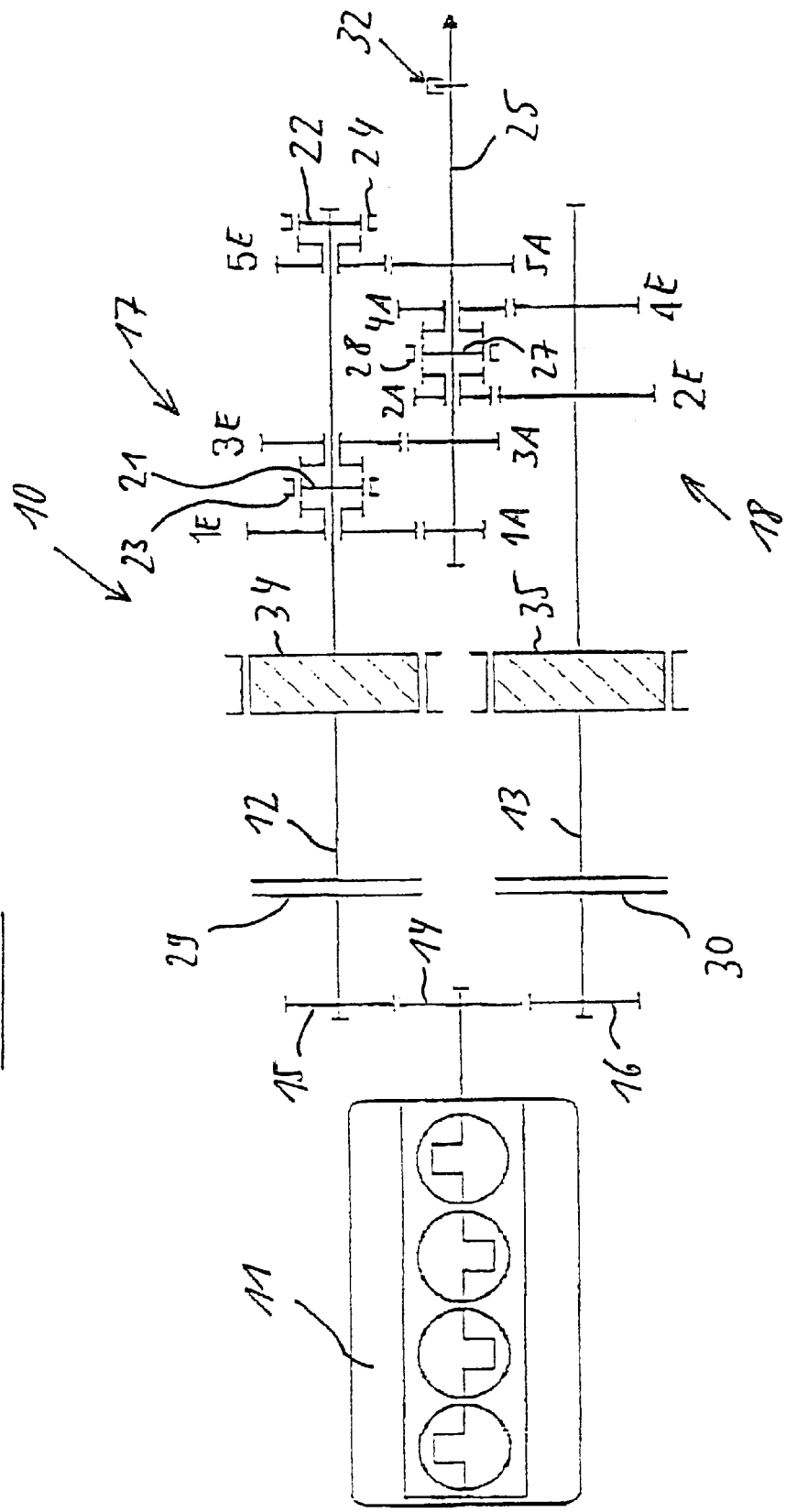
FIG. 1, a first drive train of a motor vehicle, shown schematically.

In FIG. 1, reference numeral 10 indicates a transmission of a motor vehicle, which is coupled to an internal combustion engine 11. The transmission 10 is embodied as a so-called twin-clutch manual transmission. To that end, the transmission 10 has two input shafts 12, 13, which are each coupled, by means of a respective gear wheel 15, 16 secured to the input shaft 12, 13 in a manner fixed against relative rotation, to a crown gear 14 secured to the crankshaft of the engine 11. Instead of a step-up by the gear wheels 15, 16 and the crown gear 14, the two input shafts 12, 13 can also be driven directly by the crankshaft, however.

Groups of gear wheels 17 and 18 are also disposed on the input shafts 12 and 13. The first gear wheel group 17 includes the gear wheels 1E, 3E, 5E disposed on the input shaft 12 in a manner capable of rotation, and the second gear wheel group 18 includes the gear wheels 2E and 4E, disposed on the second input shaft 13 in a manner fixed against relative rotation. Two gear wheels 21, 22 are also disposed, in a manner fixed against relative rotation, on the first input shaft 12; of these, one gear wheel 21 is located between the two gear wheels 1E and 3E. A sliding cuff 23, 24 cooperates with the respective gear wheels 21, 22 and causes the gear wheel 21, 22 to engage the respective gear wheel 1E, 3E or 5E.

The two input shafts 12, 13 can be coupled to an output shaft 25, which forms the drive shaft of the motor vehicle or leads to the drive shaft. The gear wheels 1A–5A corresponding to the gear wheel groups 17, 18 are disposed on the output shaft 25, and of these the gear wheels 1A, 3A and 5A are secured to the output shaft 25 in a manner fixed against relative rotation, while the gear wheels 2A and 4A are secured to the output shaft in a manner capable of rotation. Also on the output shaft 25, between the gear wheels 2A and 4A, a gear wheel 27 is secured in a manner fixed against relative rotation; it cooperates with a sliding cuff 28 in order to enable the power flow with the gear wheel 2A or 4A.

To couple the engine 11 to the output shaft 25 by means of the input shaft 12 or 13, each input shaft 12, 13 is also assigned a respective clutch 29, 30 between the engine 11 and the gear wheel groups 17, 18. If the two clutches 29, 30 are disengaged, then, for instance if the motor vehicle is on a hill, the motor vehicle may roll backwards, which is unwanted. To prevent this, a so-called hill holder device 32 that acts as a parking brake is disposed in the region of the output shaft 25. In order to detect the aforementioned rolling backward of the motor vehicle and to detect the rotary speeds and optionally the angular positions of the gear wheels 1A–5A, 1E–5E, 21, 22, 27, sensors, not otherwise shown, which are coupled to a control unit of the transmission 10 are disposed in the region of the input shafts 12, 13 and of the output shaft 25.

It is essential to the invention that in the exemplary embodiment of FIG. 1, each of the input shafts 12, 13 is connected by positive engagement to a separate electric machine 34, 35, which in turn is connected to the on-board battery of the motor vehicle. The nonpositive connection is achieved in the simplest case by the provision that each of the electric machines 34, 35 has an axially continuous rotor shaft, which is a constituent of the respective input shaft 12 and 13. However, other couplings, such as a pinion of the electric machine 34, 35, which cooperates with a gear wheel disposed on the input shaft 12, 13, are also conceivable.

The electric machines 34, 35 can also each be connected to the input shaft 12, 13 by nonpositive engagement via a respective intermediate transmission. In the exemplary embodiment, each of the electric machines 34, 35 is located between the clutches 29, 30 and the corresponding gear wheel groups 17, 18. In order to explain the function of the electric machines 34, 35 in the transmission 10, various operating states will now be addressed:

For starting the engine 11, the input gear wheels 1E–5E are decoupled from the output gear wheels 1A–5A on the output shaft 25; the transmission 10 is thus shifted to neutral. This is accomplished in that the slide cuffs 23, 24, 28 are in their middle position, in which they each cover only the corresponding gear wheels 21, 22, 27. To prevent the motor vehicle from rolling backward, the hill holder device 32 is simultaneously activated. Transmitting a starting torque to the crankshaft of the engine 11 is now no longer done as usual by means of a separate starter but instead by at least one of the two electric machines 34, 35. To reduce the required power or size of the electric machines 34, 35, however, the starting is preferably effected by both electric machines 34, 35 jointly. In that case, the two clutches 29, 30 are engaged, so that a nonpositive connection is made between the electric machines 34, 35 and the crankshaft of the engine 11. Once this has happened, the two electric machines 34, 35 are driven synchronously and at the same rpm as electric motors supplied by the motor vehicle battery, and the rpm of the electric motors is equivalent to the requisite starting rpm of the internal combustion engine 11.

It will additionally be noted at this point that in the event that transmitting the starting torque is to be done by only one of the two electric machines 34, 35, then the clutch 29, 30 of the respectively other electric machine 35, 34 is preferably disengaged, so that the input shaft 12, 13 of the electric machine 34, 35 not needed for starting will not also rotate. Otherwise, this would mean an additional energy demand on the part of the electric machine 34, 35 used for the starting.

Once the engine 11 has been started, one or both of the previously engaged clutches 29, 30 is disengaged again. For starting up in 1st gear, which is formed by the meshing pair of gear wheels 1E and 1A, it is necessary that a power flow from gear wheel 1E to gear wheel 1A be made possible. This is accomplished by displacing the sliding cuff 23 on the gear wheel 21 such that this gear wheel is put into operative connection with the gear wheel 1E. However, if the input shaft 12 is in angular position such that the sliding cuff 23 cannot be slipped over onto the gear wheel 1E, then by means of a brief pulse of the electric machine 34, the input shaft 12 is rotated into the angular position required for this purpose. 1st gear is now selected, and for starting up the motor vehicle the clutch 29 merely has to be engaged again, and at the same time the hill holder device 32 is deactivated.

A gear change will now be described, taking as an example upshifting from 1st gear to 2nd gear: This requires that the gear wheel pair 2E, 2A be synchronized with the rpm of the output shaft 25, which is rotated by the gear wheel pair 1E, 1A of 1st gear. The matching of the rotary speeds is done by driving the gear wheel 2A at an rpm that corresponds to the rpm of the drive shaft 25 and of the gear wheel 27. To that end, with the clutch 30 disengaged, the electric machine 35 is operated as an electric motor, which drives the input shaft 13 and thus the gear wheel 2A at a rotary speed such that the gear wheel 2A rotates at the rpm of the output shaft 25. The sliding cuff 28 can now be put into operative connection with the gear wheel 2A, and as a result a power flow is established between the output shaft 25 and the input shaft 13. After that, the electric machine 35 can be switched to be currentless. Since in this state both the gear wheels 1E, 1A of 1st gear and the gear wheels 2E, 2A of 2nd gear are operatively connected to the output shaft 25, in the final analysis it suffices to disengage the one clutch 29 and at the same time to engage the other clutch 30, and as a result a gear change from 1st gear to 2nd gear can be attained without interrupting the tractive force. The sliding cuff 23 is also put out of engagement with the gear wheel 1E.

The further gear changes in upshifting of the transmission 10 are logically done in such a way that in each case the synchronized rpm of the input shaft 12, 13 of the next higher target gear is set by means of the electric machine 34, 35 coupled to the applicable input shaft 12, 13. Once this has been done, the gear wheels 3E, 4A and 5E can be put into engagement with the gear wheels 21, 22, 27 by means of the sliding cuffs 23, 24, 27. Next, the power flow between the target gear and the engine 11 is established by closing the one clutch 29, 30 of the target gear and opening the other clutch 29, 30 of the gear originally selected, and the sliding cuff 23, 24, 28 is displaced from the gear wheel 3E, 4A, 5E that was originally in engagement.

Downshifting of the gears of the transmission 10 will be described below, taking as an example changing from 3rd gear to 2nd gear: If the motor vehicle is being driven in 3rd gear, then the output shaft 25 and the input shaft 12 are driven by the engine 11, via the gear wheels 3E, 3A for the output shaft and the engaged clutch 29 for the input shaft.

The clutch 30 is conversely disengaged, and the gear wheel 2A rotates loosely on the output shaft 25. The gear wheel 2A is now brought to the requisite rpm by driving of the input shaft 13 by means of the electric machine 35; it now rotates at the rpm of the gear wheel 27 on the output shaft 25. The gear wheel 27 can now be coupled with the gear wheel 2A by means of the sliding cuff 28. Finally, the clutch 30 is engaged, the clutch 29 is disengaged, and the sliding cuff 23 located with the gear wheel 3E is put out of engagement with that gear wheel. Once again, further gear changes in downshifting take place in a logically similar way.

In conclusion, various additional possibilities of the transmission 10 will be described: In the version shown, the transmission 10 has no gear wheel set for travel of the motor vehicle in reverse. Reverse travel can be effected by providing that when the clutches 29, 30 are disengaged, 1st gear is put into engagement with the output shaft 25, and 1st gear is driven by the electric machine 34 in the opposite direction of rotation. In that case, the rpm of the electric machine 34 is determined by the position of the accelerator pedal. Since as a rule one drives in reverse for only a short distance, it should be possible for the vehicle battery to furnish the requisite energy. However, to provide security for driving far enough in reverse, the other clutch 30 can also be engaged during the reverse travel, but then 2nd or 4th gear must not be operatively connected with the output shaft 25. In that state, the electric machine 35 is driven via the clutch 30 from the crankshaft of the engine 11. The electric machine 35 can therefore function as a generator, which feeds energy into the battery.

The feeding of the battery is typically done by a generator that is constantly driven by the engine of the motor vehicle, and this accordingly increases the fuel consumption of the motor vehicle. With the transmission 10, it is possible for the energy required for charging the battery to be at least partly recovered from the kinetic (rolling) energy of the motor vehicle. To that end, in the overrunning mode of the motor vehicle, the clutch 29, 30 of whatever gear has just been selected is disengaged, and the electric machine 34, 35 is driven as a generator by the rolling motor vehicle, via the output shaft 25. In addition, the engine 11 can also be stopped, so that even more fuel can be saved. If the rolling speed of the motor vehicle decreases to such an extent that the rpm of the input shaft 12, 13 of the gear selected, on the side of the engine 11 remote from the clutch 29, 30, threatens to drop below the idling rpm of the engine 11, then the applicable clutch 29, 30 is engaged again, and as a result the crankshaft of the engine 11 is rotated again and the engine is thus started.

By coupling the electric machines 34, 35 to the input shafts 12, 13 and because it is possible to decouple them from the engine 11 by means of the clutches 29, 30, the possibility is afforded in a simple way of operating the motor vehicle as a hybrid vehicle. In this case, for driving in downtown areas, for instance, the vehicle is driven solely by the two electric machines 34, 35, while the engine 11 is shut off. It is understood that for use as a hybrid vehicle, the size and power of the electric machines should be adapted accordingly, since in that case the requisite power is no longer oriented to the process of starting the engine 11.

A separate generator can be dispensed with whenever, in cases when just then there is no imminent gear change and the voltage status of the battery necessitates it, for the particular one of the two electric machines 34, 35 that is not jointly rotating, because it is force-free, to be into operative connection with the engine 11 via the clutch 29, 30, so that the electric machine 34, 35 then functions as a generator.

Finally, the possibility will be mentioned of temporarily using one or both electric machines 34, 35 as an additional drive mechanism for the motor vehicle, in that the electric machines reinforce the propulsion by the engine 11 ("power assist mode"). To that end, via one or both electric machines 34, 35, a torque is transmitted to the output shaft 25 and acts in the same direction as the torque generated by the engine 11. In the event that both electric machines 34, 35 are to transmit an additional torque to the output shaft 25, there are two options for the electric machine 34, 35 25 whose associated clutch 29, 30 is disengaged first, because the selected gear was selected via the other input shaft 12, 13: first, it is preferably provided that the applicable clutch 29, 30 be engaged, so that the applicable electric machine 34, 35 will transmit its torque via the gear wheel 15, 16 to the crown gear 14; second, however, it is also conceivable to leave the applicable clutch 29, 30 open, and to transmit the additional torque directly to the output shaft 25 via a gear wheel pair 1E, 1A through 5E, 5A. To that end, however, as in a gear change, the rpm of one gear wheel pair 1E, 1A through 5E, 5A of the applicable input shaft 12, 13 must be synchronized with the rpm of whichever gear wheel pair 1E, 1A through 5E, 5A is in engagement at the moment, and then the nonpositive engagement with the output shaft 25 must be established.

Figure 2:
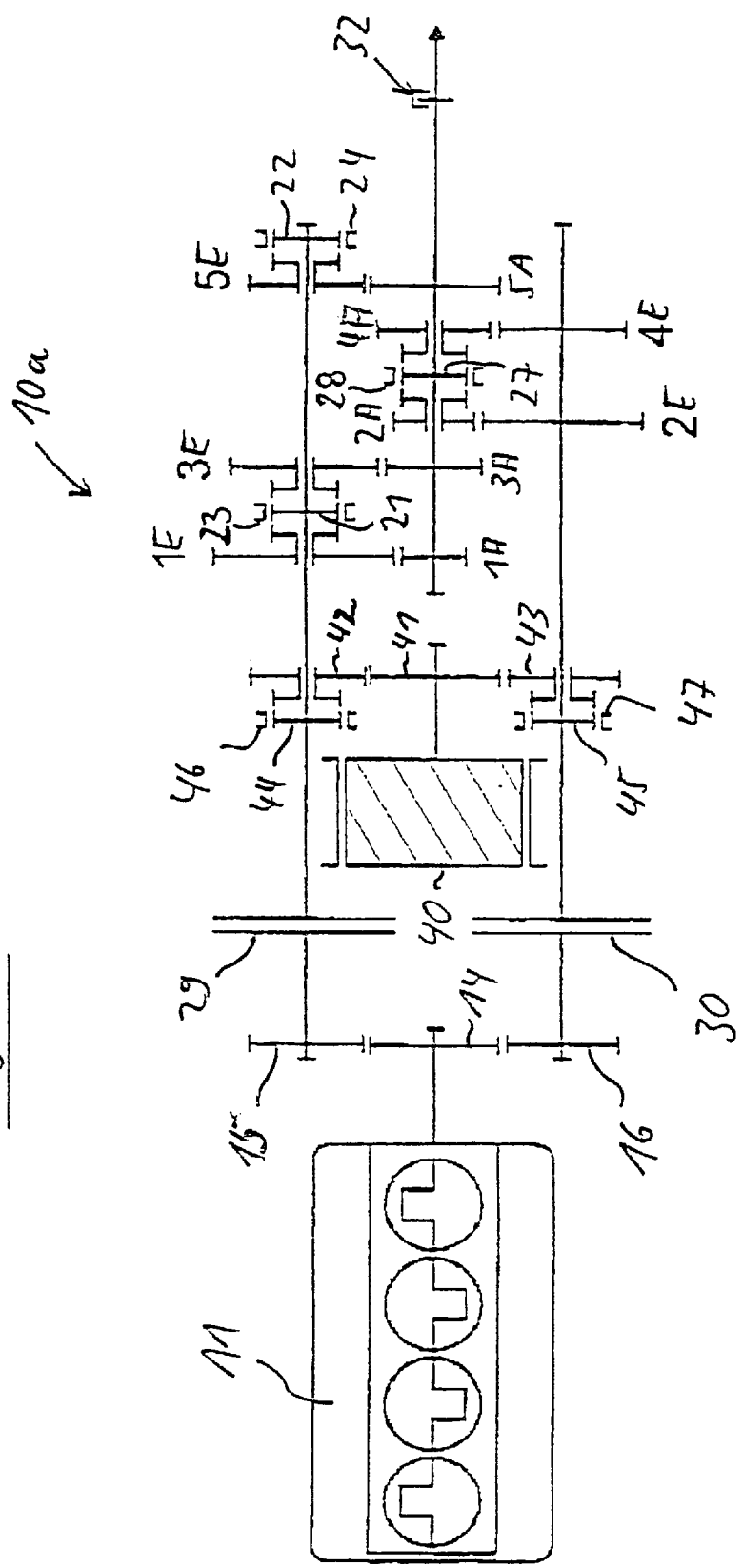
FIG. 2, a second drive train of a motor vehicle, again shown schematically.

In contrast to the exemplary embodiment of FIG. 1, in the transmission 10a of FIG. 2 only a single electric machine 10 40 is required, which is disposed between the input shafts 12, 13. If possible, the same reference numerals have been used otherwise in FIG. 2 for identical components of the transmissions 10 and 10a. The electric machine 40 is coupled with a gear wheel 41, which drives two further gear wheels 42, 43 that are disposed loosely on the respective input shaft 12 and 13. Additional gear wheels 44 and 45, secured firmly to the respective input shaft 13 and 13, via sliding cuffs 46 and 47, furnish the requisite nonpositive engagement with the electric machine 40. The gear changes take place analogously to the first exemplary embodiment; the electric machine 40 sets the synchronized rpm of the input shaft 12, 13 of the target gear, and this shaft is in this case coupled to the electric machine 40 by means of the sliding cuff 46 or 47.

In contrast to the first exemplary embodiment, starting of the engine 11 by means of the transmission 10a is done by putting the electric machine 40 into operative connection with the input shaft 12 or the input shaft 13 via the shifting cuffs 46, 47. With the clutch 29 or 30 engaged, and with the output shaft 25 in neutral, the starting torque of the electric machine 40 is thus transmitted via either one of the two input shafts 12, 13 or via both input shafts 12, 13.

The other operating states, such as driving in reverse, power assist mode, or charging of the battery, can be realized in the transmission 10a in a logically similar way to the transmission 10. It is evident that the electric machine 40 is designed to be larger or more powerful than the electric machines 34, 35, with the power of the electric machine 40 determined especially by the power required to start the engine 11. The reduced expense from having only one electric machine is counteracted, however, by an additional engineering expense because of the selective coupling of the electric machine 40 to the input shaft 12, 13 (additional gear wheels 41–45, sliding cuffs 46, 47).

The exemplary embodiments shown in FIGS. 1 and 2 are merely examples and are therefore shown structurally quite simply. In a structural conversion, for instance, it is appropriate particularly for space reasons not to dispose the two input shafts 12, 13 parallel to one another but instead to embody one of the two input shafts 12, 13 as a hollow shaft, within which the other input shaft 12, 13 rotates.

The transmission 10, 10a can also have a conventional reverse gear with a corresponding pair of gear wheels on the input shaft 12, 13 and the output shaft 25. In that case, reverse travel takes place solely via a nonpositive coupling to the engine 11.

Moreover, the invention should not be limited to transmissions that have one output shaft and two input shafts. Transmissions in which the groups of gear wheels are disposed for example on one input shaft and one output shaft or on an intermediate shaft are also covered by the concept of the invention. Versions with multiple output shafts are also conceivable.

Both transmissions 10 and 10a can be embodied as or be a component of manual transmissions or automatic transmissions. In either case, however, because of the sometimes quite complex events, it is necessary that an electronic switchgear be used for open- or closed-loop control of the various events; this switchgear processes the measurement values detected by the sensors mentioned and in turn triggers actuators, for example for displacing the sliding cuffs, or selects various modes of operation.

What is claimed is:

1. A transmission for a motor vehicle having an internal combustion engine, comprising at least two transmission input shafts and at least one transmission output shaft having a plurality of pairs of gear wheels that form different ratios between said at least two transmission input shafts and said at least one transmission output shaft; two clutch devices for connecting the internal combustion engine of the motor vehicle to said at least one output shaft by nonpositive engagement, at least one of said transmission input shafts is coupleable to at least one electrical machine which, for starting the internal combustion engine, drives at least one of said transmission input shafts connectable le by nonpositive engagement to the engine, and for driving the motor vehicle in reverse with said clutch devices disengaged drives said at least one transmission output shaft.

2. A transmission for a motor vehicle as defined in claim 1, wherein the two transmission input shafts which each cooperate with a respective electrical machine and one transmission output shaft are provided, and the electrical machines being disposed on sides of said clutch devices remote from the internal combustion engine.

3. A transmission for a motor vehicle as defined in claim 1, wherein the two transmission input shafts, one transmission output shaft and one electrical machine are provided, and the electrical machine is coupleable to one of the transmission input shafts.

4. A transmission for a motor vehicle as defined in claim 1, wherein the two transmission input shafts, one transmission output shaft and one electrical machine are provided, and the electrical machine is coupleable to both the transmission input shafts.

5. A transmission for a motor vehicle as defined in claim 1, wherein the nonpositive engagement between the at least one electrical machine and at least one of said transmission input shafts is effected directly.

6. A transmission for a motor vehicle as defined in claim 1; and further comprising an intermediate transmission which effects the nonpositive engagement between the at least one electrical machine and at least one of said transmission input shafts.

7. A transmission for a motor vehicle as defined in claim 1; and further comprising a device for blocking said transmission output shaft and disposed on said at least one transmission output shaft.

8. The transmission of claim 1, characterized in that for driving the motor vehicle in reverse, while at least one of the clutch devices disengaged, at least one of the electric machines drives the at least one transmission output shaft.

9. The transmission of claim 1, characterized in that to reinforce the torque induced by the engine to the at least one transmission output shaft, at least one electric machine introduces an additional torque to the at least one transmission output shaft, in the same direction of rotation as the engine.

10. A method for operating a transmission for a motor vehicle, in particular a twin-clutch manual transmission of claim 1, characterized in that for energy recovery in the overrunning mode of the motor vehicle, with at least one of the clutch devices disengaged, at least one electric machine is driven by its input shaft and functions as a generator.

* * * * *